(12) United States Patent
Kohn et al.

(10) Patent No.: US 10,754,657 B1
(45) Date of Patent: *Aug. 25, 2020

(54) COMPUTER VISION PROCESSING IN HARDWARE DATA PATHS

(71) Applicant: Ambarella International LP, Santa Clara, CA (US)

(72) Inventors: Leslie D. Kohn, Saratoga, CA (US); Robert C. Kunz, Sunnyvale, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/381,388

(22) Filed: Apr. 11, 2019

Related U.S. Application Data

(63) Continuation of application No. 15/459,284, filed on Mar. 15, 2017, now Pat. No. 10,296,351.

(51) Int. Cl.
*G06F 9/312* (2018.01)
*G06F 13/28* (2006.01)
*G06F 15/80* (2006.01)
*G06F 9/38* (2018.01)
*G06F 13/16* (2006.01)
*G06F 9/30* (2018.01)

(52) U.S. Cl.
CPC ........ *G06F 9/3851* (2013.01); *G06F 9/30043* (2013.01); *G06F 13/1673* (2013.01); *G06F 13/28* (2013.01); *G06F 9/3877* (2013.01); *G06F 9/3881* (2013.01); *G06F 9/3885* (2013.01); *G06F 15/80* (2013.01); *G06F 15/8007* (2013.01); *G06F 15/8053* (2013.01)

(58) Field of Classification Search
CPC .. G06F 9/3851; G06F 9/30043; G06F 9/3877; G06F 9/3881; G06F 9/3885; G06F 9/30036; G06F 13/1673; G06F 13/28; G06F 15/80; G06F 15/8007; G06F 15/8053; G06F 15/82; G06F 15/8046
USPC ..... 712/4, 18, 19, 25, 34-36, 214, 215, 225, 712/227
See application file for complete search history.

(56) References Cited

U.S. PATENT DOCUMENTS 6,266,053 B1 * 7/2001 French .................. G06T 17/005
345/440
7,313,552 B2 * 12/2007 Lorenz .................. G06N 5/025
706/47

(Continued)

OTHER PUBLICATIONS

Vincent Ranwez et al. "Subontology Extraction Using Hyponym and Hypernym Closure on is-a Directed Acyclic Graphs" IEEE vol. 24, No. 12, Dec. 2012 (Year: 2012).*

*Primary Examiner* — Daniel H Pan
(74) *Attorney, Agent, or Firm* — Christopher P. Maiorana, PC (57) ABSTRACT

An apparatus includes a memory and a processor. The memory may be configured to store a directed acyclic graph. The processor may be configured to (i) receive a command to run the directed acyclic graph, (ii) parse the directed acyclic graph into a data flow including one or more operators, (iii) schedule the operators in one or more data paths, and (iv) generate one or more output vectors by processing one or more input vectors in the data paths. The processor generally comprises a plurality of hardware engines. The data paths may be implemented with the hardware engines. The hardware engines may operate in parallel to each other.

20 Claims, 7 Drawing Sheets

(56) References Cited

U.S. PATENT DOCUMENTS

| | | | |
|---|---|---|---|
| 7,818,541 B2* | 10/2010 | Rhoades | G06F 30/327 |
| | | | 712/22 |
| 8,037,437 B2* | 10/2011 | Davis | G06F 30/3312 |
| | | | 716/113 |
| 10,296,351 B1* | 5/2019 | Kohn | G06F 13/28 |
| 10,318,306 B1* | 6/2019 | Kohn | G06F 9/5044 |
| 10,437,600 B1* | 10/2019 | Kohn | G06F 3/0631 |
| 2007/0185950 A1 | 8/2007 | Yoshino | 708/492 |
| 2008/0104365 A1 | 5/2008 | Kohno | 712/1 |
| 2017/0099226 A1* | 4/2017 | Vasseur | H04L 47/826 |

* cited by examiner

COMPUTER VISION PROCESSING IN HARDWARE DATA PATHS

This application relates to U.S. Ser. No. 15/459,284, filed Mar. 15, 2017, which is incorporated by reference in its entirety.

FIELD OF THE INVENTION

The invention relates to vector processing generally and, more particularly, to a method and/or apparatus for implementing computer vision processing in hardware data paths.

BACKGROUND

Conventional general purpose programmable processors executing sequential streams of instructions address different criteria across diverse problem domains. Aggressive pipelining and out-of-order execution have been applied to extract parallelism from the instruction streams, but the gains are limited by inherent data and control dependencies. To further improve performance, single instruction, multiple data (SIMD) instructions and multiple cores executing parallel instruction streams have been used. However, the resulting implementations tend to be inefficient and do not exploit detailed understandings of the problem domain to optimize data paths and dynamic random access memory bandwidth. Furthermore, the implementations are difficult for compilers to extract the inherent parallelism of processes expressed in conventional programming languages. The demanding specifications of real time computer vision processing drives toward a more power and cost efficient implementation using specialized engines for computer vision tasks. However, computer vision tasks are rapidly evolving and the specialized engines are not commonly flexible to support new or enhanced tasks.

It would be desirable to implement computer vision processing in hardware data paths.

SUMMARY

The invention concerns an apparatus including a memory and a processor. The memory may be configured to store a directed acyclic graph. The processor may be configured to (i) receive a command to run the directed acyclic graph, (ii) parse the directed acyclic graph into a data flow including one or more operators, (iii) schedule the operators in one or more data paths, and (iv) generate one or more output vectors by processing one or more input vectors in the data paths. The processor generally comprises a plurality of hardware engines. The data paths may be implemented with the hardware engines. The hardware engines may operate in parallel to each other.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing computer vision processing in hardware data paths that may (i) provide a flexible hardware coprocessor engine, (ii) execute data flow graphs for computer vision tasks, (iii) operate on variable size vectors, (iv) operate on multidimensional vectors, (v) implement high level operations solely in hardware, (vi) optimize internal memory bandwidth, (vii) optimize external memory bandwidth and/or (viii) be implemented as one or more integrated circuits.

Embodiments of the architecture generally implement a flexible hardware coprocessor engine for directly executing data flow graphs for computer vision tasks. Each data flow graph may be specified as a set of operators connected through a directed acyclic graph (DAG) structure that specifies explicit dependencies. The operators may operate on variable-size multidimensional vectors. In addition to simple operators like add and multiply, higher level operations such as convolution and matrix multiply may be provided in the coprocessor. The architecture generally allows computer vision tasks to more efficiently use available hardware units, and to optimize an external memory bandwidth and an internal memory bandwidth.

The computer vision tasks may contain extensive data parallelism in the form of vector operations on images and/or multidimensional vectors. Each directed acyclic graph may specify primary inputs (loaded from memory), primary outputs (stored to memory) and a set of operations. The operations may be related to each other (e.g., by links) with some operations running in parallel. Each input of an operation, if any, may be connected to a primary input or an output of an upstream operation. Each output of each operation may be connected to a primary output and/or downstream operation inputs. The directed acyclic graphs generally allow full parallelism of the tasks to be expressed by eliminating control flow dependencies and making all data dependencies explicit.

Figure 1:
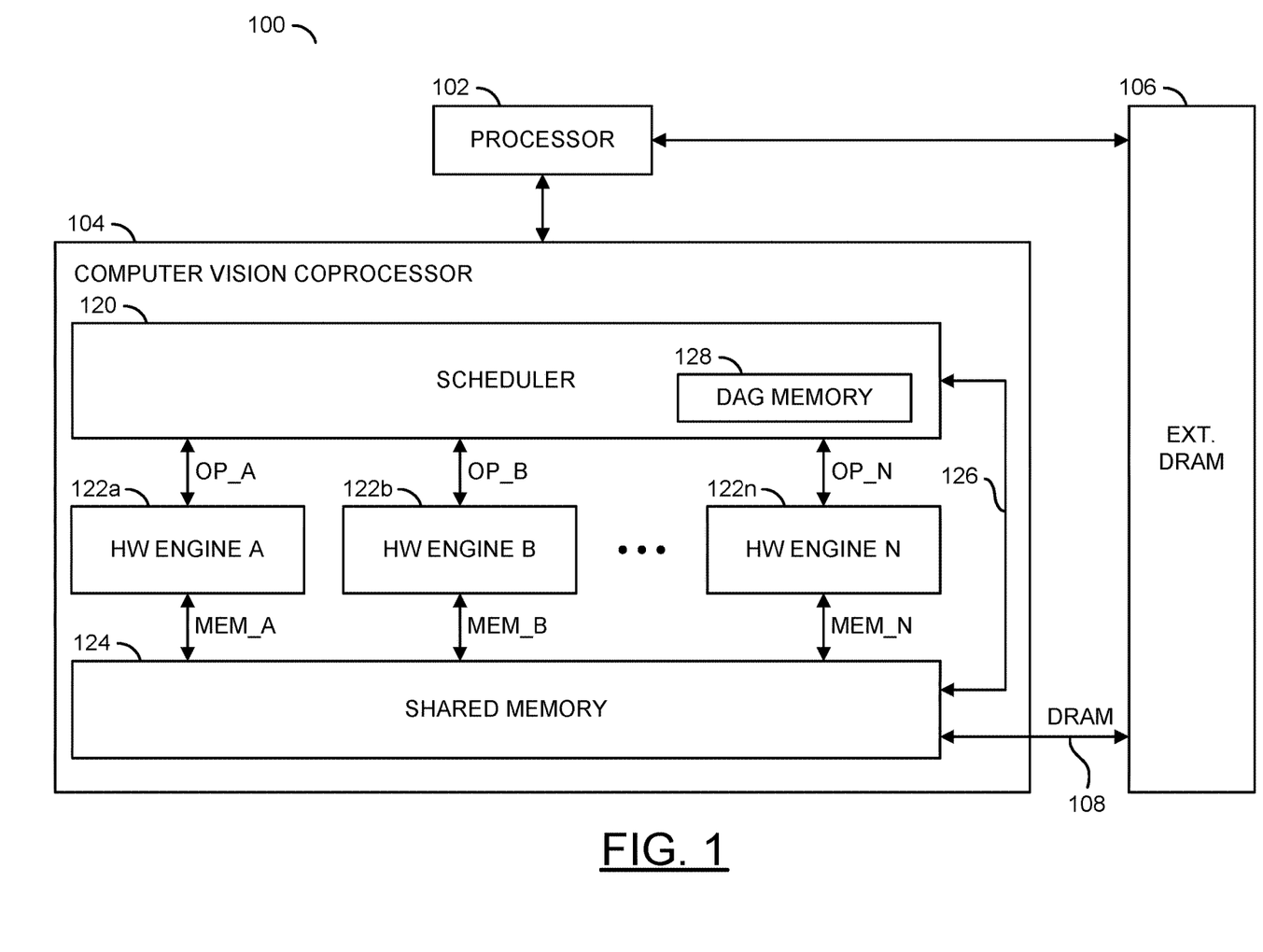
FIG. 1 is a diagram of a system.

Referring to FIG. 1, a diagram of a system 100 is shown illustrating a context in which one or more vector processing operations may be implemented in accordance with an example embodiment of the invention. The system (or apparatus) 100 may be implemented as part of a computer vision system. In various embodiments, the system 100 may be implemented as part of a camera, a computer, a server (e.g., a cloud server), a smart phone (e.g., a cellular telephone), a personal digital assistant, or the like.

In an example embodiment, the system 100 generally comprises a block (or circuit) 102, a block (or circuit) 104, a block (or circuit) 106 and a memory bus 108. The circuit 104 generally comprises a block (or circuit) 120, one or more blocks (or circuits) 122a-122n, a block (or circuit) 124 and a path 126. The circuit 120 may include a block (or circuit) 128.

Multiple signals (e.g., OP_A to OP_N) may be exchanged between the circuit 120 and the respective circuits 122a-122n. Each signal OP_A to OP_N may convey execution operation information and/or yield operation information. Multiple signals (e.g., MEM_A to MEM_N) may be exchanged between the respective circuits 122a-122n and the circuit 124. The signals MEM_A to MEM_N may carry data. A signal (e.g., DRAM) may be exchanged between the circuit 106 and the circuit 124. The signal DRAM may transfer data between the circuits 106 and 124.

The circuit 102 may implement a processor circuit. In some embodiments, the processor circuit 102 may be a general purpose processor circuit. The processor circuit 102 may be operational to interact with the circuit 104 and the circuit 106 to perform various vector processing tasks.

The circuit 104 may implement a coprocessor circuit. The coprocessor circuit 104 is generally operational to perform specific vector processing tasks as arranged by the processor circuit 102. In various embodiments, the coprocessor 104 may operate as a directed acyclic graph vector processor implemented solely in hardware. The coprocessor 104 may directly execute a data flow directed acyclic graph generated by software that specifies vector processing (e.g., computer vision) tasks. The directed acyclic graph generally contain descriptors that specify input/output buffers in the circuit 106 and/or the circuit 124, computation nodes that perform vector processing computations, called operators, and the dependencies between data buffers and operators (e.g., links in the graphs).

The circuit 106 may implement a dynamic random access memory (DRAM) circuit. The DRAM circuit 106 is generally operational to store multidimensional arrays of input data elements and various forms of output data elements. The DRAM circuit 106 may exchange the input data elements and the output data elements with the processor circuit 102 and the coprocessor circuit 104.

The circuit 120 may implement a scheduler circuit. The scheduler circuit 120 is generally operational to schedule tasks among the circuits 122a-122n to perform a variety of computer vision tasks as defined by the processor circuit 102. Individual tasks may be allocated by the scheduler circuit 120 to the circuits 122a-122n. The scheduler circuit 120 may time multiplex the tasks to the circuits 122a-122n based on the availability of the circuits 122a-122n to perform the work.

Each circuit 122a-122n may implement a processing resource (or hardware engine). The hardware engines 122a-122n are generally operational to perform specific processing tasks. In some configurations, the hardware engines 122a-122n may operate in parallel and independent of each other. In other configurations, the hardware engines 122a-122n may operate collectively among each other to perform allocated tasks. The hardware engines 122a-122n may be homogenous processing resources (all circuits 122a-122n may have the same capabilities) or heterogeneous processing resources (two or more circuits 122a-122n may have different capabilities). The operators performed by the hardware engines 122a-122n may include, but are not limited to, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator and an upsample operator. In various embodiments, the hardware engines 122a-122n may be implemented solely as hardware circuits.

The circuit 124 may implement a shared memory circuit. The shared memory 124 is generally operational to store all of or portions of the multidimensional arrays (or vectors) of input data elements and output data elements generated by the hardware engines 122a-122n. The input data elements may be received from the DRAM circuit 106 via the memory bus 108. The output data elements may be sent to the DRAM circuit 106 via the memory bus 108.

The path 126 may implement a transfer path internal to the coprocessor 104. The transfer path 126 is generally operational to move data from the scheduler circuit 120 to the shared memory 124. The transfer path 126 may also be operational to move data from the shared memory 124 to the scheduler circuit 120.

The circuit 128 may implement a local DAG memory. The DAG memory 128 may be operational to store one or more binary representations of one or more directed acyclic graphs used by the scheduler circuit 120. The directed acyclic graph representations may be compiled external to the system 100 and loaded into the DAG memory 128 through the shared memory 124.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands. In some embodiments, multiple (e.g., two) separate tables may be employed, a table of all operators and another table of all descriptors linked together with explicit registers.

The directed acyclic graph descriptions may be different than traditional processor programs in several fundamental ways. Dependencies between operators may occur locally and are stated explicitly in the directed acyclic graph instead of implied by the sequential ordering of instructions in the program. In conventional instruction streams, instructions share states through global state registers or on-chip memory. While the directed acyclic graph supports conditional execution, the vector processing (e.g., coprocessor 104) may execute natively without benefit of a program counter or control flow present in instruction streams. Looping generally exists as higher dimensions in a vector and without the aid of looping variables. Operator inputs and outputs may be vector operands of up to several (e.g., 4) or more dimensions. The size of each dimension may be variable, rather than a few fixed-size scalar or single instruction, multiple data (SIMD) data types. Complex vector operations generally allow tasks to be efficiently expressed. Furthermore, the directed acyclic graphs may have no concept of a program counter or instruction streams. A master scheduler (e.g., the scheduler circuit 120) may time-multiplex operators on available hardware resources (e.g., the hardware engines 122a-122n) based on data dependencies expressed in the graph. In traditional processors, instructions execute atomically. In the vector processor, complex operators with some input data available, may partially execute based on available hardware resources. Partial execution generally allows the hardware resources to be scheduled more efficiently and allows on-chip memory (e.g., the shared memory 124) to be used to pass results between operators instead of storing and loading from an external memory (e.g., the DRAM circuit 106).

Operators may use optimized data paths to directly perform complex vector operations efficiently and with lower memory bandwidth. The data paths may replace nested for-loops that repeat a code sequence on a conventional processor, and associated overhead like loop unrolling, software pipelining, branch prediction and superscalar execution. The operators may match common looping structures present in computer vision tasks and image processing tasks. The directed acyclic graphs may connect the complex operators into computational pipelines, with conditional execution, finite iteration, and direct memory access (DMA) transfers that execute in parallel as resources are available without intervention by software. The directed acyclic graphs generally provide a flexible way to specify new tasks (or processes), while still providing better efficiency than conventional processors.

Figure 2:
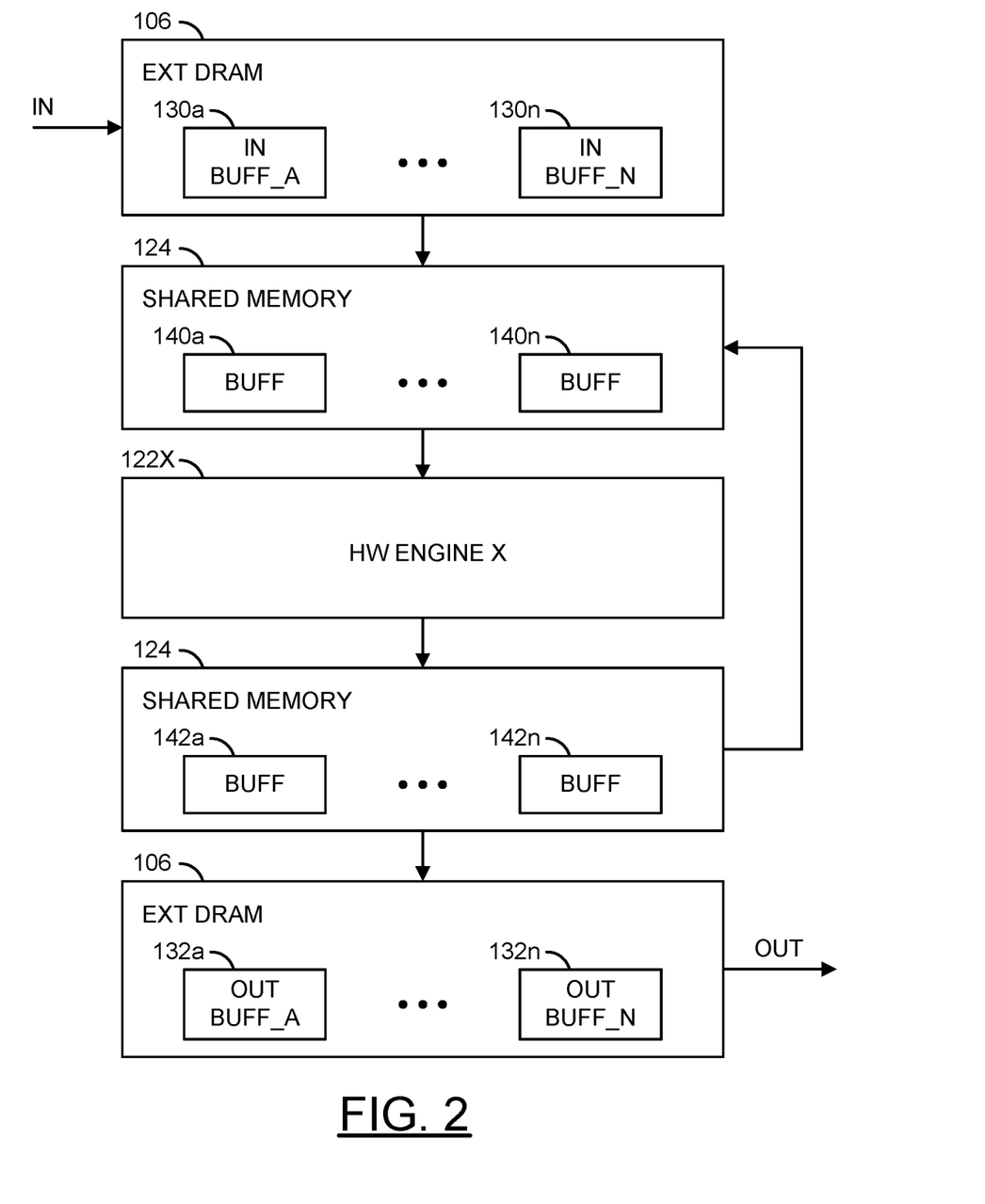
FIG. 2 is a flow diagram of execution in the system.

Referring to FIG. 2, a flow diagram of an example directed acyclic graph execution in the system 100 is shown. The example execution generally begins with input data being received in the DRAM circuit 106 via an input signal (e.g., IN). The input data may be stored in input data structures in one or more input buffers 130a-130n. The input data may be transferred from the input buffers 130a-130n in DRAM circuit 106 to corresponding input buffers 140a-140n in the shared memory 124. Control of moving the input data to and from the DRAM circuit 106 may be controlled by direct memory access transfers requested by the processor 102. One or more of the hardware engines 122a-122n (e.g., an example hardware engine 122x is illustrated) may operate on the input data in one or more of the buffers 140a-140n. Output data generated by the hardware engine 122x may be either stored in one or more output buffers 142a-142n in the shared memory 124 or directly linked to another operator in another hardware engine 122a-122n without utilizing a shared buffer.

In some situations, the output data from one or more of the hardware engines 122a-122n may be used as the input data for the same and/or other hardware engines 122a-122n. For example, the output data from the hardware engine 122a may be used as the input data for the hardware engine 122b. In another example (e.g., a non-looping or non-feedback situation) where a hardware engine 122n is being time-multiplexed to perform various operations, the output data from the hardware engine 122n may be buffered and later used as the input data into the same hardware engine 122n.

Once processing on the data has completed, the final output data may be transferred from the buffers 142a-142n in the shared memory 124 to output data structures in the output buffers 132a-132n in the DRAM circuit 106. The final output data may be transferred out of the DRAM circuit 106 via an output signal (e.g., OUT). Control of moving the final output data to and from the DRAM circuit 106 may be controlled by direct memory access transfers requested by the processor 102.

Figure 3:
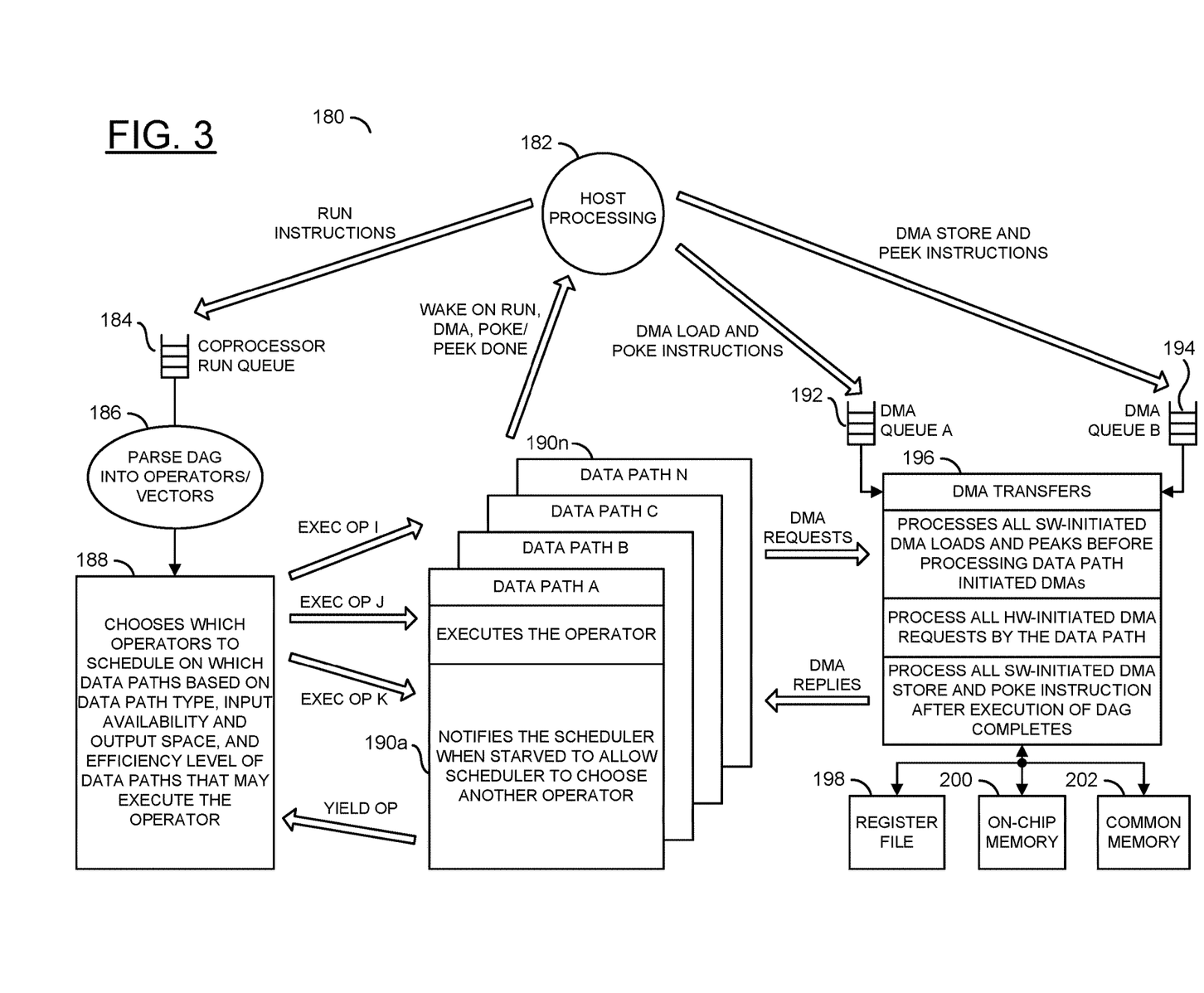
FIG. 3 is a flow diagram of vector processing.

Referring to FIG. 3, a flow diagram of example vector processing 180 is shown. The vector processing 180 generally comprises a step (or state) 182, a step (or state) 184, a step (or state) 186, a step (or state) 188, one or more steps (or states) 190a-190n, a step (or state) 192, a step (or state) 194, a step (or state) 196, a step (or state) 198, a step (or state) 200 and a step (or state) 202. The vector processing 180 may be implemented by the system 100

The directed acyclic graph vector processing performed by the coprocessor 104 generally supports the general-purpose host processing in the processor 102 where the processor 102 may execute traditional reduced instruction set computing (RISC)-based instructions. Software running on the processor 102 may be the controlling task. Prior to run time, a directed acyclic graph compiler may prepare one or more binary representations of one or more directed acyclic graphs composed of operators, the location of primary input/output data structures in DRAM circuit 106, and the links between operators through the shared memory 124. The directed acyclic graph binary representations may be loaded into the DAG memory 128.

As the host processing executes a coprocessor instruction, the instruction may be placed into a queue of the coprocessor. The coprocessor executes the coprocessor instruction from each queue, one at a time. Fetching of input vectors from the DRAM circuit 106 may be specified by separate direct memory access instructions that are not part of the current directed acyclic graph, or may be initiated by the directed acyclic graph. In the latter case, whole input vectors and/or only part of the input vectors may be loaded at any one time. Similarly, stores may be either separate direct memory access instructions or initiated by the directed acyclic graph, in which case whole vectors and/or only part of the vectors may be stored at any one time.

Software running on the processor 102 may command execution of the directed acyclic graph in the coprocessor 104 by executing a "run" coprocessor instruction in the step 182. The "run" coprocessor instruction may be buffered in a coprocessor run queue in the step 184. The "run" instruction generally specifies the address of the directed acyclic graph representation in the DAG memory 128 as an input argument. In some situations, the graphs may be triggered by other means, such as a store to a particular address.

The scheduler circuit 120 may parse the directed acyclic graph into one or more operators and one or more input vectors in the step 186. The scheduler circuit 120 may schedule execution of the operators in the directed acyclic graph in the step 188, and subsequently notify the processor 102 when the directed acyclic graph completes the processing. The scheduler circuit 120 may choose which operators to schedule on which data paths 190a-190n based on the data path types, input availability, output space, and/or efficiency levels of the data paths that may execute the operators. Each data path 190a-190n generally corresponds to a respective hardware engine 122a-122n. Each data path 190a-190n may deal with a single operation at a time. The scheduling may result in execution operations (e.g. EXEC OP I to EXEC OP K) being issued to the data paths 190a-190n. In various situations, multiple operators may be executed in parallel.

In some situations, feedback paths may be appropriate to perform the vector processing tasks. However, directed acyclic graphs generally do not contain any directed cycles and lack any looping control structure. The lack of looping control generally simplifies scheduling, limits internal buffering, and avoids deadlock conditions. Looping control may be performed by the controlling task 188 that may run a directed acyclic graph multiple times.

In addition to the "run" command, the processor 102 generally supplies other support instructions to allow software executing in the processor 102 some control over the hardware execution. Poke Instructions: The software may make some adjustments to the compiled directed acyclic graph by supplying parameters to guide execution and/or fill in fields that are unknown at directed acyclic graph compilation time. The poke instructions may be buffered in a DMA queue A in the step 192. By way of example, the poke instructions may include the locations of input/output vectors in the DRAM circuit 106 that are unknown during directed acyclic graph compilation.

Peek instructions: The software may specify return values from the directed acyclic graphs after execution completed. The peek instructions may be buffered in a DMA queue B in the step 194. In peek instruction cases, the software may request a transfer in the step 198 from the coprocessor 104 into a general purpose register file in the processor 102. The transfer generally occurs when the coprocessor 104 notifies the controlling task that the directed acyclic graph has completed. The number of registers on the processor 102 may be limited, so only a few results may be returned with each peek instruction. Larger results are generally stored to the DRAM circuit 106.

Wait: A wait instruction may stall the controlling task until all of the instructions for the current directed acyclic graph have completed (including peek instructions and poke instructions). The hardware in the coprocessor 104 generally controls the timing of run, poke/peek, or other vector processor instructions. When the controlling task executes vector processor instructions, the processor 102 may notify the coprocessor 104 that software requests the operations to happen in an ordered way relative to the run instruction (typically pokes before the run command, and peeks afterwards). However, the timing of when the instructions actually execute may be controlled completely by the scheduler circuit 120. Other types of instructions may be implemented to meet the design criteria of a particular application.

The direct memory access transfers may be performed in the step 196 by a direct memory access engine. A highest priority of the direct memory access transfers may be to process all software-initiated direct memory access load instructions and peek instructions before processing direct memory access transfers initiated by the data paths 190a-190n. Next, the direct memory access transfers may process all hardware-initiated request made by the data paths 190a-190n. Finally, the software-initiated direct memory access transfers for store instructions and poke instructions may be executed after the directed acyclic graph tasks are complete. The direct memory access transfers may take place between the data paths (e.g., hardware engines 122a-122n) 190a-190n, the host processing (e.g., the processor 102) in the step 182, the register files in the step 198, an on-chip memory (e.g., the shard memory 124) in the step 200 and/or the common memory (e.g., the DRAM circuit 106) in the step 202.

Figure 4:
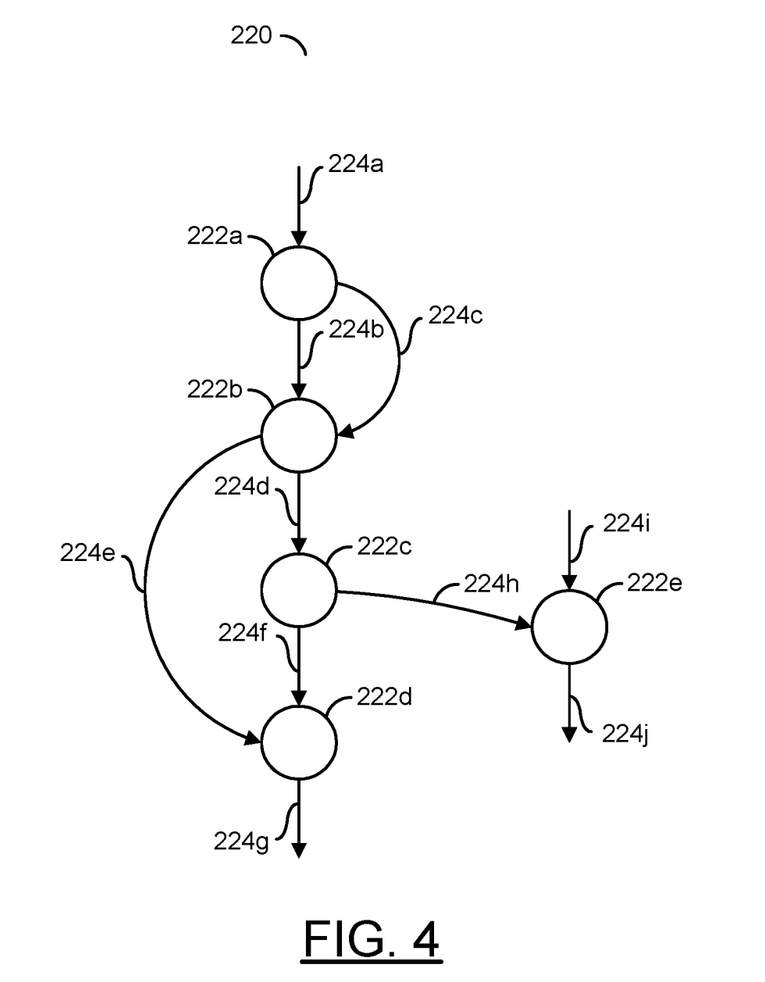
FIG. 4 is a diagram of a directed acyclic graph.

Referring to FIG. 4, a diagram of an example directed acyclic graph 220 is shown. The directed acyclic graph 220 generally comprises one or more operators (or functions) 222a-222e and a plurality of links (or connections) 224a-224j. Each operator 222a-222e may be implemented by one or more of the hardware engines 122a-122n. In the example illustrated, an initial link 224a may be specified by the scheduler circuit 120 identifying where one or more input vectors are located in the shared memory 124. The scheduler circuit 120 may choose one of the hardware engines 122a-122n that is capable of performing the operator 222a and is available for work to process the input vectors.

Output vectors created by the operator 222a may be buffered in the shared memory 124 by the links 224b and 224c. The scheduler circuit 120 may select the same, or another hardware engine 122a-122n to perform the operator 222b using the output vectors generated by the operator 222a as input vectors. The operator 222b may generate more output vectors that are buffered in the shared memory 124 per the links 224d and 224e.

The operator 222c may be performed by the same, or a different hardware engine 122a-122n. An input vector for the operator 222c may be the output vector buffered in the shared memory 124 from the link 224d. The operator 222c may generate additional output vectors that are buffered in the shared memory 124 per the links 224f and 224h.

The operator 222d may be performed by the same, or a different hardware engine 122a-122n. Input vectors for the operator 222d may be the output vectors buffered in the shared memory 124 per the link 224e (generated by the operator 222b) and the link 224f (generated by the operator 222c). The operator 222d may store one or more output vectors in the shared memory 124 per the link 224g.

The operator 222e may be performed by the same, or a different hardware engine 122a-122n. One or more input vectors for the operator 222e may be the output vectors buffered in the shared memory 124 per the link 224h and one or more additional input vectors per the link 224i. The operator 222e may store one or more output vectors in the shared memory 124 per the link 224j.

Figure 5:
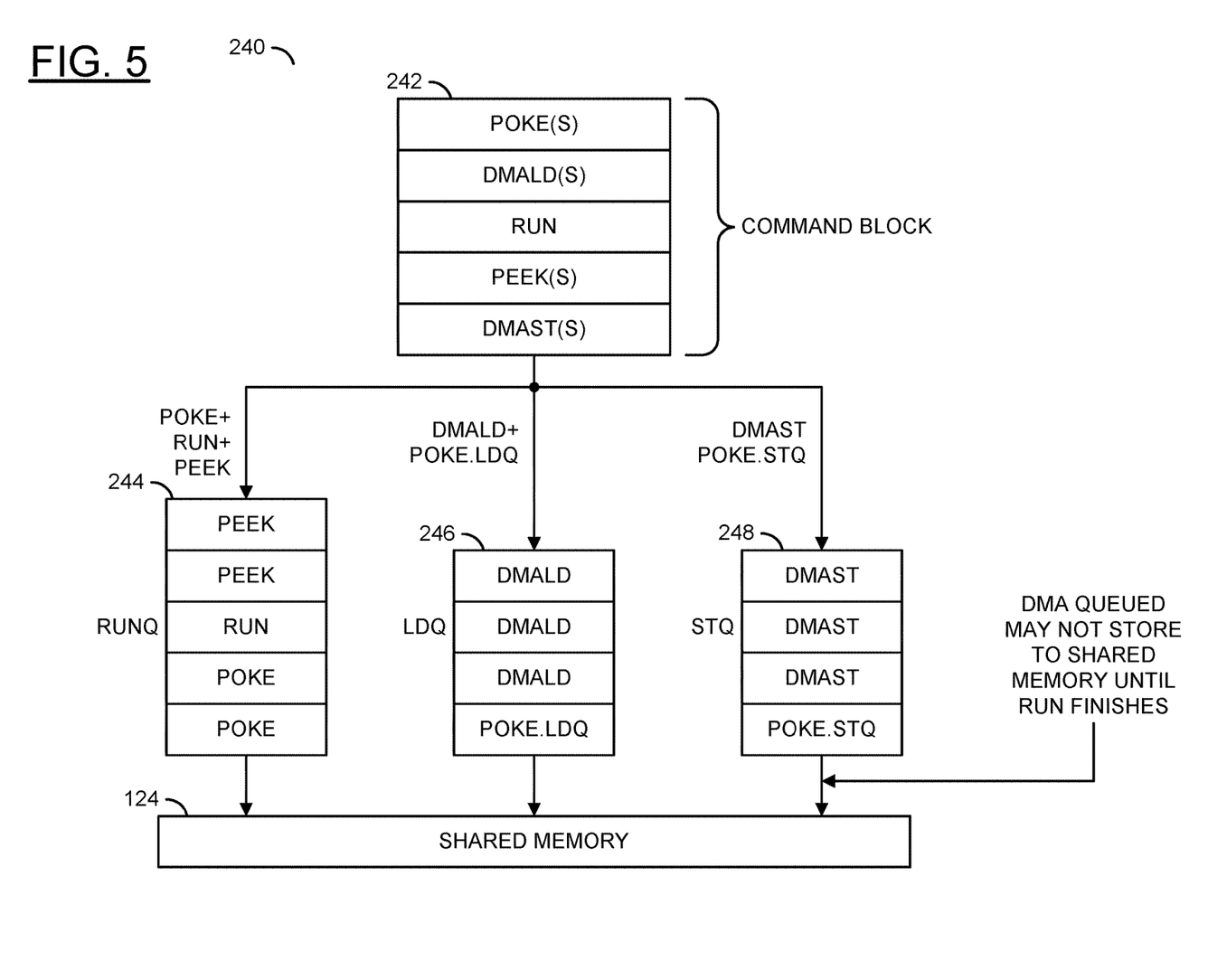
FIG. 5 is a diagram of a memory hierarchy in the system.

Referring to FIG. 5, a diagram of an example implementation of a memory hierarchy 240 is shown. The memory hierarchy 240 generally comprises a buffer (or queue) 242, a buffer (or queue) 224, a buffer (or queue) 246, a buffer (or queue) 248 and the shared memory 124. The memory hierarchy 240 may be implemented in the processor 102, the coprocessor 104 and the DRAM circuit 106.

The system 100 generally contains layers of memory hierarchy with different trade-offs in bandwidth, size, and access latency. The coprocessor 104 may optimize for access patterns present in the operators. The coprocessor 104 may provide a directed acyclic graph execution model without direct intervention from processor software.

Instructions may be transferred into a variety of queues by the processor 102. DMA instructions may be removed from the queues and executed by a DMA engine. The DMA load instructions and store instructions generally transfer data between the DRAM circuit 106 and the shared memory 124. The DMA engine may generate a sequence of accesses to both memories to transfer the data in order to execute the DMA instructions.

The buffer 242 may implement a command block buffer in the processor 102. The command block 242 may store multiple instructions that the processor 102 requests the coprocessor 104 to perform. In the example, the command block 242 may include zero or more poke instructions, one or more DMA load instructions, one or more run instructions, zero or more peek instructions and one or more DMA store instructions.

The buffer 244 may implement a run queue in the coprocessor 104. The poke instructions, the run instructions and the peek instructions of the command block 242 may be transferred to the run queue 244 by the processor 102.

The buffer 246 may implement a load queue in the coprocessor 104. The DMA load instructions and the poke instructions related to the loads in the command block 242 may be transferred to the load queue 246 by the processor 102.

The buffer 248 may implement a store queue in the coprocessor 104. The DMA store instructions and the poke instructions related to the stores in the command block 242 may be transferred to the store queue 248 by the processor 102.

All of the processor software initiated instructions may, in some way, operate with the shared memory 124 and may be sequenced in the separate queues 244, 246 and 248. The run instructions, while not DMA operations, generally operate on the shared memory 124 in that the coprocessor 104 may read the DAG construct from the shared memory 124 to the DAG memory 128, instead of fetching the DAG construct from the DRAM circuit 106. In some embodiments, the coprocessor 104 may read the DAG construct from the DRAM circuit 106.

Execution of a directed acyclic graph in a direct way may involve loading all input vectors and storing all output vectors of each operator from/to the DRAM circuit 106. However, constantly accessing the DRAM circuit 106 generally becomes bandwidth intensive. Such DRAM circuit

106 bottlenecks may limit the effective rate of computation and available parallelism even with a general-purpose caching hierarchy (typically only spatial locality may be exploited in streaming applications and the memory latency of a cache miss blocks execution while the data is fetched). Alternatively, the full input vector and the output vectors may be stored in on-chip memory, but the amount of on-chip memory to implement is impractical.

Instead, the coprocessor 104 generally executes multiple operators in parallel while only buffering a minimal (or small) amount of data in the on-chip shared memory 124 suitable for the scheduled operators to make progress. The coprocessor 104 may include dedicated on-chip resources (e.g., the data paths 190*a*-190*n*) for executing the operators. Different types of data paths may be customized (or optimized) for specific operators, or groups of operators, with similar control structures and memory access patterns. While a single instance of a data path may run only a single operator at once, generally a 1:1 correspondence between an operator and a data path does not exist. An implementation of the coprocessor 104 may include many data paths that can run the same operator type, or a single data path 190*a*-190*n* that can run many types of operators. Separate implementations of the coprocessor 104 may contain different operators and types of supported data paths.

Only a small amount of data may be buffered on-chip for operators to continue making progress. The minimum amount of data generally depends on the type of operation. For example, a windowed operation typically buffers up several rows of a vector (or array) before processing a moving window over available input data to generate output data. In some cases, the minimum amount of data may be the entire vector (called a full-vector buffer). The vectors in such cases may be constrained to a size that fits in the on-chip memory.

The coprocessor 104 may include a scheduling mechanism (e.g., the scheduler circuit 120) to allow the hardware engines 122*a*-122*n* to automatically execute operators that are ready to run using that on-chip resources that are available. The scheduling generally minimizes the amount of buffering performed by allowing an operator to partially execute on a data path. If enough input data is available for the operator to progress, the scheduler circuit 120 may place the operator on a data path. The scheduling mechanism generally enables out-of-order execution of operators and may virtualize the relationship between the operator and the data paths.

If a producing operator sends data to a consuming operator and the amount of data utilized by the consuming operator is small (typically less than one line), the two operators may be directly linked to each other using a shared first-in-first-out (FIFO) buffer. The shared FIFOs may be dedicated for a specific connection between data paths executing the operators or pooled together in a common FIFO memory and allocated by the software during DAG construction. The directly linked connection generally provides a highest available bandwidth and a smallest memory usage of any other available on-chip memory structures. An advantage of direct chaining is that operators may not be bandwidth limited when direct chaining is used on the input vectors and output vectors, such as registers in a conventional processor. The software may choose the size of memory to use for buffering during DAG compile time or allow hardware to choose the size based on the number of direct chaining buffers in the DAG. If the software chooses, the hardware may provide registers for the software to specify the subset of the full vector stored in internal on-chip memory. If the hardware chooses, the size may be determined by taking the entire pool of memory available for direct chaining and partitioning the memory similarly among all of the direct chaining buffers. The software may weight the relative sizes of each direct chaining buffers to give some buffers a larger partition.

As the memory buffering between producing operators and consuming operators increase, a second level of on-chip memory may provide more space with the tradeoff of lower bandwidth. The software may select the size of the on-chip memory to use for buffering during DAG compile time. Memory chaining buffers generally contain a subset of the output vectors from an operator, namely the data used for downstream operators to make reasonable forward progress. The software may specify a partial dimension and the size of the partial dimension.

When data transfers to/from the DRAM circuit 106 and the operators, buffering criteria may be treated in a similar way as connections between operators. A portion of on-chip memory may be dedicated for the consuming operator or the producing operator to buffer load or store data from/to the DRAM circuit 106 based on processing rates of the operator, and transfer size required to optimize DRAM access efficiency. As with chaining buffers, a subset of the DRAM data is generally contained in the buffer.

Software-managed buffers generally allow the processor software to direct memory access the data into the shared memory 124, especially if the vector is small. Using special DMA instructions, the controller task may preload input vectors from the DRAM circuit 106 into the shared memory 124, or store output vectors from the shared memory 124 to the DRAM circuit 106 after a DAG program completes. The DMA operations may execute on entire vectors, thus any software-managed buffer may completely fit into the shared memory 124 without streaming or partial buffering. Such buffers may be referred to as "software-managed" buffers because the communication may be managed via how the controlling task sequences the execution of the DAGs and the DMA operations in the task.

The coprocessor 104 is generally managed by the controlling task running on the processor 102. The processor 102 may implement higher level looping constructions that may not be expressed as vector operations in the DAG, for example, a loop that violates the "acyclic" part of a DAG. The processor software executing one or more tasks that utilize feedback or more processing than may be fit in a single DAG may use multiple DAGs to build up a full-fledge task. The multiple DAGs may be executed by the controlling task. While data sharing may not specify software-managed buffers, software-managed buffering may allow different DAGs to share information using the on-chip memory exclusively. The controlling task may always share data between DAGs through the DRAM circuit 106.

The coprocessor 104 may provide a circular buffer of vectors where each bank in a single vector for software-managed buffer cases. Each bank may be held in the shared memory 124 and sized to the original vector dimensions. Hardware in the coprocessor 104 generally manages a read pointer and a write pointer to track available vectors in the buffer. The processor software may not modify the bank pointers during the DAG execution. The coprocessor 104 may update the software-visible banking pointers at the end DAG execution. DAGs that load data from the circular buffer may advance the read pointer, and DAGs that store data from the banked vectors may advance the writer pointer. The number of banks is generally determined at DAG compile time, and task software may be responsible for scheduling the producing and consuming DAGs to avoid overflowing the number of banks in the circular buffer.

The read and write bank pointers may be optionally exposed to software via the "peek" instructions. The location of the bank pointers in memory generally depend on a layout of the DAG itself, and two different DAGs may not place the bank pointers in the same memory location. If the circular buffer is to be shared between two different DAGs, the controlling task may copy bank points between DAGs using the poke instructions.

The producer/consumer of a software-managed buffer may be the controlling task in the processor 102. The processor software may preload data into the banked buffer using a "DMALD" instruction that copies data from the DRAM circuit 106 into the banks. When the instruction DMALD completes, the coprocessor 104 generally advances the read bank pointer. Similarly, the "DMAST" instruction may copy data from the banks to the DRAM circuit 106 and the coprocessor 104 advances the write bank pointer. The instructions may be coprocessor support instructions and ordered with peek/poke/run instructions. The processor software may request that the operation is made, but the hardware of the coprocessor 104 may be responsible for determining the best time to initiate the transfer.

Figure 6:
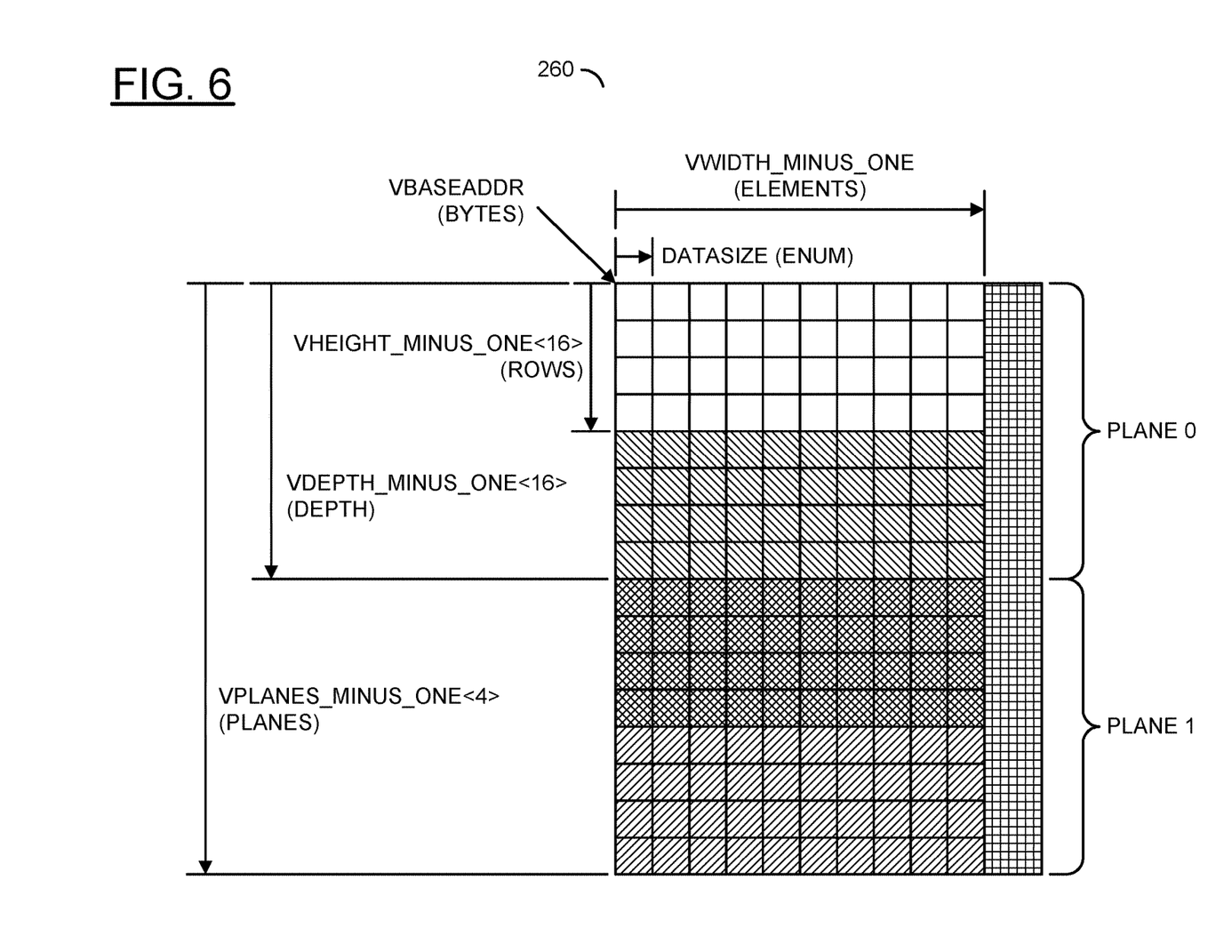
FIG. 6 is a diagram of a multidimensional vector.

Referring to FIG. 6, a diagram of an example multidimensional (e.g., four-dimensional) vector 260 is shown. The vector 260 may be laid out in raster-scan order in the DRAM circuit 106. Multiple (e.g., four) terms generally define a respective size of each of the multiple dimensions. A vector width (e.g., VWIDTH) may specify a width dimension as VWIDTH_MINUS_ONE+1 elements wide. A vector height (e.g., VHEIGHT) may specify a height dimension as VHEIGHT_MINUS_ONE+1 rows tall. A vector depth (e.g., VDEPTH) may specify a depth dimension as VDEPTH_MINUS_ONE+1 units deep. A vector planar dimension (e.g., VPLANES) may specify a planar dimension as VPLANAE_MINUS_1 planes. Each vector may have a base address (e.g., VBASEADDR), both in the DRAM circuit 106 and the shared memory 124 (either partial or full). All elements may have a same size (e.g., DATASIZE). The parameter DATASIZE may define the bit-size of the elements (either 8 bits, 16 bits, etc.).

Vectors are generally collections of data elements that share the same arithmetic type. The type may be integer, fixed point, floating point, or more general element types (e.g. complex number). Vectors may be used for every connection in the directed acyclic graph tasks, including primary inputs and outputs and inter-operator links. An operator generally consumes zero or more input vectors to produce at least one output vector. In some situations, an operator may not utilize any input operands. For example, a random number generator operator may be implemented without an input operand (e.g., no seed value).

Each vector may have a dimensionality from zero (e.g., scalar) to N-dimensions. A value of N (e.g., at least 4) may be determined by the specific implementation of the system 100, but every implementation supports dimensions between 0 and N. Each dimension may have a magnitude, either unary (e.g., 1) or significant (>1). Unary dimensions generally reduce an effective dimensionality of the vector. For example, a two-dimensional vector may have two significant dimensions and N−2 unary dimensions.

Each dimension in a vector may represent a loop structure when striding through the vector. Consider a two-dimensional vector having a height (e.g., H) and width (e.g., W). For each row in the height H and for each column in the width W, an operation may be performed on the vector data in a current row and current column. With a three-dimensional vector having a depth (e.g., D), the number of nested loops generally increases by one. Now for each layer in the depth D, each row in the height H and for each column in the width W, the operation may be performed on the vector data in a current layer, a current row and current column. The approach may be extended to four-dimensional vectors (e.g., planes P), five-dimensional vectors and higher dimensional vectors. Each extra dimension generally adds another loop (except a dimension length of "1" that may not utilize a loop). Looping variables (e.g., depth, row, column), may not exist within a directed acyclic graph process. Instead, the hardware in the coprocessor 104 may create equivalent variables to stride through the vector to perform the operation.

"Loop reorder" parameters may exist to allow the processor software to rearrange loop structures within the coprocessor 104. Each input operand to an operator may have a loop reorder parameter that the processor software may specify. The processor software generally does not create loop variables and place the loops properly, as is done in common programs. Instead, the loop reorder parameter may serve such a purpose. For example, if the dimensions are plane×depth×heigh×width, the loop reorder parameter may adjust the order to depth×place×height×width, and the coprocessor 104 automatically swaps the planar dimension and the depth dimension internally when fetching data from memory.

In various embodiments where the height should be the major dimension instead of depth, the scheduler 120 may parse the directed acyclic graph to stride through the operation based on row, depth and column. Three-dimensional vectors may result in 6 possible combinations (e.g., depth, row, column; depth, column, row; row, depth, column; row, column, depth; column, depth, row, and column, row, depth). Four-dimensional vectors may result in 24 possible combinations. N-dimensional vectors may result in N factorial possible combinations. Designs of the coprocessor 104 may supports all such possible combinations for a predetermined value of N (e.g., N=4).

Two input operands implemented in the coprocessor 104 may have different magnitudes along each dimension. Consider the following two-dimensional example. Let X be a two-dimensional vector of H×W, Y be a one-dimensional vector of H×1, Z be a one-dimensional vector of 1×W, and K be a scalar vector of 1×1. For each row and for each column, a vector (e.g., A) may be expressed by formula 1 as follows:

$$A[\text{row}][\text{col}]=X[\text{row}][\text{col}]+Y[\text{row}]+Z[\text{col}]+K \qquad (1)$$

The scalar variable K may not be indexed by row or column and thus repeated for every element in the two-dimensional vector. Each entry of the vector Y may be constant for every column in a row, and the entire vector Z may be reused for every row in the image.

The coprocessor 104 generally implements such reuse through dimensional up-conversion by converting any unary dimension of an input vector to a significant dimension of another input vector to the operator. The operator may apply the dimension up-conversion automatically based on the dimensionality of the input operands. For example, where dealing with two vectors A and B, if the dimensions of A=B=1, no up-conversion is be performed. If the dimension of A=1 and B=N, the dimension of A may be up-converted to the dimension of B. If the dimension of A=N and B=1, the dimension of B may be up-converted to the dimension of A.

If the dimension of A=N and B=M, no dimensional up-conversion may be performed as N=M may be the only legal condition.

The dimensional up-conversion may be applied along all dimensions of a vector. For example, a vector X may have dimensions of P×1×H×1 and a vector Y may have dimensions 1×D×1×W for N=4. Both vectors X and Y may have the same dimension P×D×H×W after applying the dimensional up-conversion rules. The hardware of the coprocessor 104 generally optimizes up-conversions by avoiding unnecessary copying of up-converted data using index addressing into the vector.

Computer vision tasks commonly process variable sized lists of objects that meet specific conditions. The size may be dynamic as the number of objects generally depend on a part of the graph and conditional checks. However, sizing decisions of the vectors may be made statically during DAG construction.

The coprocessor 104 may implement two types of variable-length vectors (e.g., JaggedVectors and ShortVectors). The variable-length vectors may still be described as N-dimensional vectors and are either unary/significant along each dimension just like normal vectors. JaggedVectors may reserve a value for special termination symbol(s) that marks all remaining entries along a dimension as invalid. Consuming operators may ignore elements or higher-dimensional blocks after the termination symbol and advance to the next valid entry in the vector. Different symbols may be reserved for each dimension (e.g., a symbol EOL for end-of-row, a symbol EOF for end-of-frame, etc, up to the Nth dimension) or contain a marker for a subset of the dimensions (e.g., a single EOL marker, but valid along all other dimensions). The termination symbols generally occupy values of the range defined by the data format of the vector, so the dynamic range of the vector may be reduced when JaggedVectors are used. Dimensions where all elements are valid may not utilize a termination symbol.

If an operator produces a result that aliases with the termination symbol during normal processing, the result the operator may suppress the termination symbol by clamping the value to a valid value within the dynamic range of the vector data type, flagging an error and/or generating an invalid vector.

ShortVectors may be similar to JaggedVectors, but lack termination symbols. Suppression is not used as the full dynamic range of the vector data format may be utilized. The location of the end of a dimension may be maintained by the coprocessor 104 and may propagate through downstream operators. The termination location may not be visible to the processor software directly. In that case, the termination location may by calculated within the DAG using side-band operators or inferred by the processor software using other information available in the graph.

To address conditional execution of subgraphs with a DAG, the coprocessor 104 generally provides an invalid vector. All vectors begin as valid vectors, but an operator may produce an invalid vector during execution of the DAG. Any downstream operator that consumes an invalid vector may immediately propagate the invalid vectors to all connected output operands and halt processing. Invalid vectors may be created by the DAG flow deliberately or created due to some illegal condition detected during execution. For example, floating point exceptions causing not-a-number (NaN) situations may create an invalid vector condition.

Figure 7:
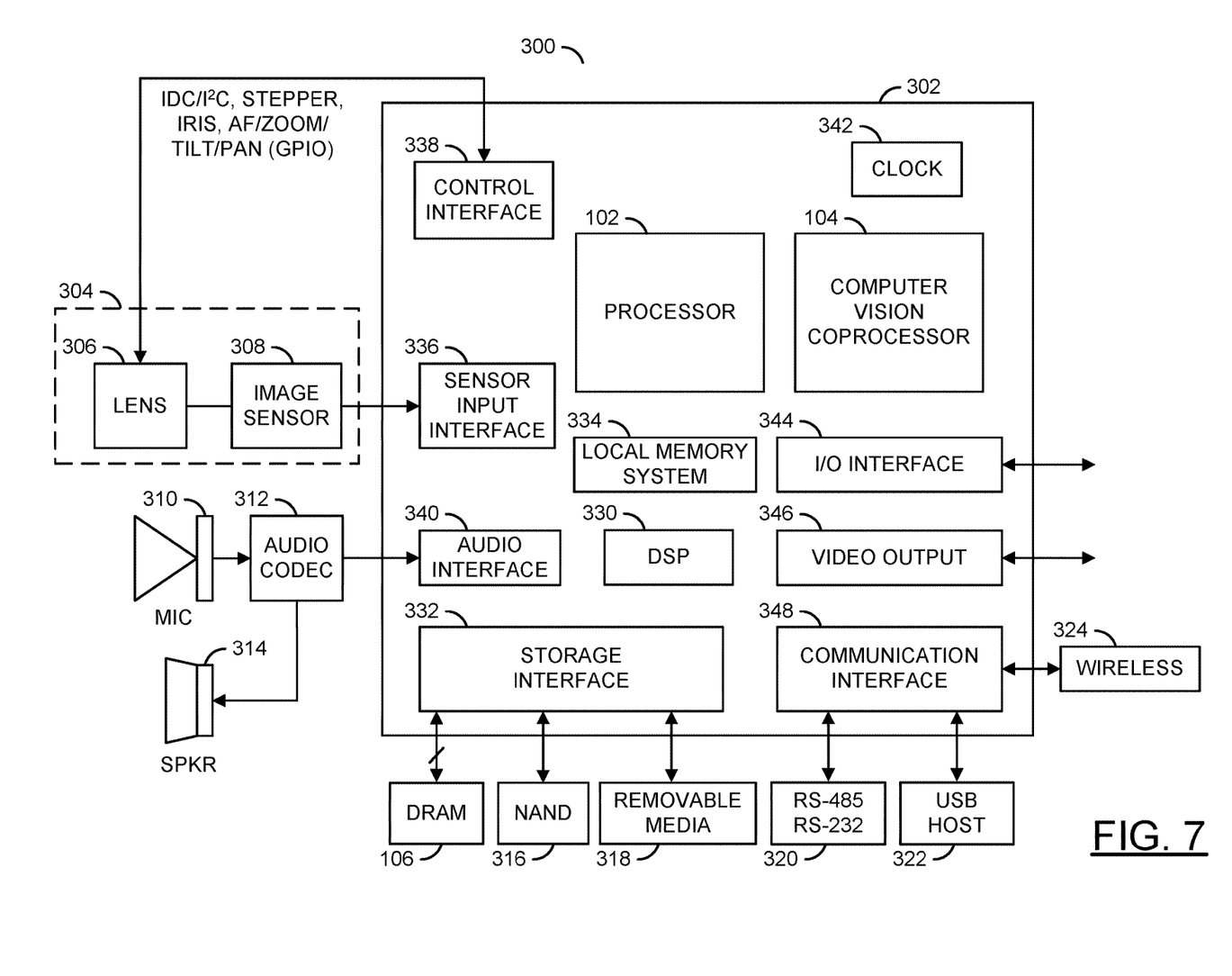
FIG. 7 is a diagram of a camera system.

Referring to FIG. 7, a diagram of a camera system 300 is shown illustrating an example implementation of a vector processing system in accordance with an embodiment of the present invention. In one example, the electronics of the camera system 300 may be implemented as one or more integrated circuits. For example, an application specific integrated circuit (ASIC) or system on chip (SOC) may be used to implement the camera system 300.

In one example, the camera system 300 may comprise the DRAM circuit 106, a processor/camera chip (or circuit) 302, a block (or assembly) 304 having a block 306 and one or more blocks (or circuits) 308, a block (or circuit) 310, a block (or circuit) 312, a block (or circuit) 314, a block (or circuit) 316, a block (or circuit) 318, a block (or circuit) 320, a block (or circuit) 322 and a block (or circuit) 324. The circuits 106 and 304-324 may be connectable to the camera circuit 302.

In various embodiments, the camera circuit 302 may comprise the processor 102 (e.g., ARM, etc.), the coprocessor 104, a block (or circuit) 330, a block (or circuit) 332, a block (or circuit) 334, a block (or circuit) 336, a block (or circuit) 338, a block (or circuit) 340, a block (or circuit) 342, a block (or circuit) 344, a block (or circuit) 346 and a block (or circuit) 348. The circuits 102 through 348 may be connected to each other using one or more buses, traces, protocols, etc.

The circuit 304 may implement a lens and sensor assembly. The lens and sensor assembly 304 is shown connected to the camera circuit 302. In some embodiments, the lens and sensor assembly 304 may be a component of the camera circuit 302 (e.g., a SoC component). In some embodiments, the lens and sensor assembly 304 may be a separate component from the camera circuit 302 (e.g., the lens and sensor assembly may be an interchangeable component compatible with the camera circuit 302). In some embodiments, the lens and sensor assembly 304 may be part of a separate camera connected to the processing portion of the circuit 302 (e.g., via a video cable, a high definition media interface (HDMI) cable, a universal serial bus (USE) cable, an Ethernet cable, or wireless link). The lens and sensor assembly 304 may comprise other components (not shown). The number, type and/or function of the components of the lens and sensor assembly 304 may be varied according to the design criteria of a particular application.

The block 306 may implement a lens 306. The lens 306 may capture and/or focus light input received from the environment near the camera 300. The lens 306 may capture and/or focus light for the circuit 308. The lens 306 may be implemented as an optical lens. The lens 306 may provide a zooming feature and/or a focusing feature. The lens and sensor assembly 304 may be implemented with additional circuitry (e.g., motors) to adjust a direction, zoom and/or aperture of the lens 306. The lens 306 may be directed, tilted, panned, zoomed and/or rotated to provide a targeted view of the environment near the camera 300.

The circuit 308 may implement an image sensor. The image sensor 308 may receive light from the lens 306. The image sensor 308 may be configured to transform the received focused light into digital data (e.g., bitstreams). In some embodiments, the image sensor 308 may perform an analog to digital conversion. For example, the image sensor 308 may perform a photoelectric conversion of the focused light received from the lens 306. The image sensor 308 may present the converted image data as a color filter array (CFA) formatted bitstream. The camera circuit 302 may transform the bitstream into video data, video files and/or video frames (e.g., human-legible content).

The circuit 310 may be a microphone for capturing audio. The circuit 312 may be an audio codec for recording audio in a particular format. The circuit 314 may be a speaker for playing audio.

The circuit 316 may implement a nonvolatile memory (e.g., NAND flash memory, NOR flash memory, etc.). The circuit 318 may implement a removable media 318 (e.g., secure digital media (SD), secure digital extended capacity media (SDXC), etc.). The circuit 320 may implement one or more serial communication channels 320 (e.g., RS-485, RS-232, etc.). The circuit 322 may implement one or more universal serial bus (USB) hosts 322 and/or USE interfaces. The circuit 324 may implement wireless interface for communicating with a user device (e.g., a smart phone, a computer, a tablet computing device, cloud resources, etc.). In various embodiments, the wireless interface 324 and/or the USB Host 322 may be configured for communicating with a camera controller wirelessly. In the embodiment shown, the circuits 304-324 are implemented as components external to the camera circuit 302. In some embodiments, the circuits 304-324 may be components on-board the camera circuit 302.

The circuit 330 may be a digital signal processing (DSP) module. In some embodiments, the circuit 330 may implement separate image DSP and video DSP modules. The DSP module 330 may be configured to process digital signals. The DSP module 330 may comprise an image digital signal processor (IDSP), a video digital signal processor DSP (VDSP) and/or an audio digital signal processor (ADSP). The DSP module 330 may be configured to receive information (e.g., pixel data values captured by the image sensor 308) from the circuit 336. The DSP module 330 may be configured to determine the pixel values (e.g., RGB, YUV, luminance, chrominance, etc.) from the information received from the sensor input 336. The DSP module 330 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The circuit 332 may be a storage interface. The storage interface 332 may be configured to manage one or more types of storage and/or data access. In one example, the storage interface 332 may implement a direct memory access (DMA) engine and/or a graphics direct memory access (GDMA). In another example, the storage interface 332 may implement a secure digital (SD) card interface (e.g., to connect to the removable media 318).

The circuit 334 may implement a local memory system (e.g., cache, fast random access memory, etc.). In various embodiments, programming code (e.g., executable instructions for controlling various processors and encoders of the camera circuit 302) may be stored in one or more of the memories (e.g., the DRAM circuit 106, the NAND 316, etc.). When executed by the processor 102, the programming code generally causes one or more components in the camera circuit 302 to configure video synchronization operations and start video frame processing operations. The resulting compressed video signal may be presented to the storage interface 332, the video output 346 and/or the communication module 348. The storage interface 332 may transfer program code and/or data between external media (e.g., the DRAM circuit 106, the NAND 316, the removable media 318, etc.) and the local (internal) memory system 334.

The circuit 336 may implement a sensor input (or interface). The sensor input 336 may be configured to send/receive data to/from the image sensor 308. In one example, the sensor input 336 may comprise an image sensor input interface. The sensor input 336 may be configured to transmit captured images (e.g., light data) from the image sensor 308 to the DSP module 330 and/or the processor 102. The data received by the sensor input 336 may be used by the DSP 330 to determine a luminance (Y) and chrominance (U and V) values from the image sensor 308. The sensor input 336 may provide an interface to the lens and sensor assembly 304. The sensor input 336 may enable the camera circuit 302 to capture image data from the lens and sensor assembly 304.

The circuit 338 may implement one or more control interfaces including but not limited to an inter device communication (IDC) interface, an inter integrated circuit ($I^2C$) interface, a serial peripheral interface (SPI), and a pulse width modulation (PWM) interface. The control interface 338 may be configured to generate signals (e.g., IDC/I2C, STEPPER, IRIS, AF/ZOOM/TILT/PAN, etc.) for controlling the lens and sensor assembly 304. The signal IRIS may be configured to adjust an iris for the lens and sensor assembly 304. The control interface 338 may enable the camera circuit 302 to control the lens and sensor assembly 304.

The circuit 340 may implement an audio interface (e.g., an $I^2S$ interface, etc.). The audio interface 340 may be configured to send/receive audio data. In one example, the audio interface 340 may implement an audio inter-IC sound ($I^2S$) interface. The audio interface 340 may be configured to send/receive data in a format implemented by the audio codec 312. The circuit 342 may implement a clock circuit including but not limited to a real time clock (RTC), a watchdog timer (WDT), and/or one or more programmable timers.

The circuit 344 may implement an input/output (I/O) interface. The I/O interface 344 may be configured to send/receive data. The data sent/received by the I/O interface 344 may be miscellaneous information and/or control data. In one example, the I/O interface 344 may implement a general purpose input/output (GPIO) interface. In another example, the I/O interface 344 may implement an analog-to-digital converter (ADC) module and/or digital-to-analog converter (DAC) module. In yet another example, the I/O interface 344 may implement an infrared (IR) remote interface. In still another example, the I/O interface 344 may implement one or more synchronous data communications interfaces (IDC SPI/SSI).

The circuit 346 may be a video output module. The video output module 346 may be configured to send video data. For example, the camera 300 may be connected to an external device (e.g., a TV, a monitor, a laptop computer, a tablet computing device, etc.). The video output module 346 may implement a high-definition multimedia interface (HDMI), an LCD/TV/Parallel interface and/or a DisplayPort interface. The video data may be presented in one or more formats (e.g., PAL, NTSC, VGA, WVGA, QVGA, SD, HD, Ultra HD, 4K, etc.).

The circuit 348 may be a communication module. The communication module 348 may be configured to send/receive data. The data sent/received by the communication module 348 may be formatted according to a particular protocol (e.g., Bluetooth, USB, Wi-Fi, UART, etc.). In one example, the communication module 348 may implement a secure digital input output (SDIO) interface. The communication module 348 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX and/or SMS. The communication module 348 may also include support for communicating using one or more of the universal serial bus protocols (e.g., USB 1.0, 2.0, 3.0, etc.). The camera circuit 302 may also be configured to be powered via a USB connection. However, other communication and/or power interfaces may be implemented accordingly to meet the design criteria of a particular application.

The functions performed by the diagrams of FIGS. 1-7 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines, virtual machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a memory configured to store a directed acyclic graph; and
a processor configured to (i) receive a command to run said directed acyclic graph, (ii) parse said directed acyclic graph into a data flow including one or more operators in response to said command, (iii) schedule said operators in one or more data paths, and (iv) generate one or more output vectors by processing one or more input vectors in said data paths, wherein (a) said processor comprises a plurality of hardware engines and a queue coupled to a direct memory access engine, (b) said data paths are implemented with said hardware engines, (c) said operators are performed by said hardware engines, (d) said hardware engines operate in parallel to each other, and (e) said queue is configured to receive instructions via direct memory access transfers.

2. The apparatus according to claim 1, wherein said directed acyclic graph defines a computer vision process.

3. The apparatus according to claim 1, wherein (i) said processor further comprises a shared memory and (ii) said data flow further includes a specification of (a) one or more input buffers in said shared memory, (b) one or more output buffers in said shared memory, and (c) one or more links among said operators, said input buffers, and said output buffers.

4. The apparatus according to claim 3, wherein at least one of said output buffers acts as one of said input buffers to at least one of said operators.

5. The apparatus according to claim 1, further comprising a common memory configured as (i) one or more input data structures that provide said input vectors to said processor and (ii) one or more output data structures that receive said output vectors from said processor.

6. The apparatus according to claim 1, wherein said processor supports said input vectors having at least one of three dimensions and four dimensions.

7. The apparatus according to claim 1, wherein at least one of said hardware engines is configured to process at least one of said input vectors having variable size dimensions.

8. The apparatus according to claim 1, wherein said processor further comprises a scheduler configured to time multiplex said operators with said input vectors and said output vectors into available hardware engines.

9. The apparatus according to claim 1, wherein said direct memory access engine is configured to:
 transfer data between said hardware engines and a shared memory internal to said processor;
 transfer data between said processor and a common memory external to said processor; and
 transfer data between said shared memory and said common memory.

10. The apparatus according to claim 1, wherein said queue is configured to receive one or more of (i) load instructions and (ii) poke instructions via one or more direct memory access transfers.

11. The apparatus according to claim 10, wherein said direct memory access engine is configured to process said load instructions before processing data transfers initiated by said data paths.

12. The apparatus according to claim 1, wherein said queue is configured to receive at least one of (i) one or more store instructions and (ii) one or more peek instructions from a host system via one or more direct memory access transfers.

13. The apparatus according to claim 12, wherein said direct memory access engine is configured to process said store instructions after execution of said directed acyclic graph completes.

14. The apparatus according to claim 12, wherein said direct memory access engine is further configured to process data transfers initiated by said data paths.

15. The apparatus according to claim 1, wherein said processor is part of at least one of a computer vision system and a digital camera.

16. A method for computer vision processing, comprising the steps of:
 receiving a command to run a directed acyclic graph in a processor, wherein said command to run said directed acyclic graph is communicated to said processor via a direct memory access transfer to a queue of said processor;
 parsing said directed acyclic graph into a data flow including one or more operators;
 scheduling said operators in one or more data paths in said processor; and
 generating one or more output vectors by processing one or more input vectors in said data paths, wherein (a) said data paths are implemented with a plurality of hardware engines in said processor, (b) said operators are performed by said hardware engines, and (c) said hardware engines operate in parallel to each other.

17. The method according to claim 16, wherein said data paths are implemented with said hardware engines and at least two of said hardware engines implement different data paths.

18. The method according to claim 16, wherein said directed acyclic graph defines a computer vision process.

19. The method according to claim 16, further comprising the steps of:
 generating said command to run said directed acyclic graph externally using a host system.

20. The method according to claim 19, further comprising:
 loading said directed acyclic graph into said processor prior to communicating said command to run said directed acyclic graph from said host system to said processor.

* * * * *